United States Patent
Kanemori

(10) Patent No.: US 10,668,376 B2
(45) Date of Patent: Jun. 2, 2020

(54) ELECTRONIC GAME DEVICE AND ELECTRONIC GAME PROGRAM

(71) Applicant: DeNA Co., Ltd., Shibuya-ku, Tokyo (JP)

(72) Inventor: Yuichi Kanemori, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 135 days.

(21) Appl. No.: 16/002,921

(22) Filed: Jun. 7, 2018

(65) Prior Publication Data

US 2018/0353858 A1 Dec. 13, 2018

(30) Foreign Application Priority Data

Jun. 7, 2017 (JP) .................. 2017-112756

(51) Int. Cl.
*A63F 13/42* (2014.01)
*A63F 13/2145* (2014.01)
*A63F 13/525* (2014.01)
*A63F 13/44* (2014.01)

(52) U.S. Cl.
CPC .......... *A63F 13/42* (2014.09); *A63F 13/2145* (2014.09); *A63F 13/44* (2014.09); *A63F 13/525* (2014.09)

(58) Field of Classification Search
CPC ............... A63F 13/525; A63F 13/5252; A63F 13/5255; A63F 13/2145; A63F 13/42; A63F 2300/1075; A63F 2300/6669; A63F 2300/6661; A63F 13/44; A63F 2300/666
See application file for complete search history.

(56) References Cited

U.S. PATENT DOCUMENTS

| | | | |
|---|---|---|---|
| 2010/0302239 A1* | 12/2010 | Tokita ................ | A63F 13/06 345/419 |
| 2015/0094127 A1* | 4/2015 | Canose ............... | A63F 13/42 463/2 |
| 2018/0373376 A1* | 12/2018 | Kurabayashi ....... | A63F 13/53 |

FOREIGN PATENT DOCUMENTS

| | | |
|---|---|---|
| JP | 06-044001 A | 2/1994 |
| JP | 2013-039232 A | 2/2013 |
| JP | 5994019 B2 | 9/2016 |
| WO | 2014/147668 A1 | 9/2014 |

OTHER PUBLICATIONS

Office action for related Japanese Patent Application No. 2017-112756, dated Aug. 15, 2017; 6 pages; English translation provided.

* cited by examiner

*Primary Examiner* — Jasson H Yoo
(74) *Attorney, Agent, or Firm* — Procopio, Cory, Hargreaves & Savitch LLP

(57) ABSTRACT

An operation detector has a common operation portion in which the operation content is shared for a certain length of time after the start of the operation, and detects the start of either a slide operation associated with a command to move a three-dimensional character operated by a player in a virtual space, or a flick operation associated with another command. After the start of the operation is detected, in the common operation period, a model processor moves the three-dimensional character in the virtual space. After this, if the operation detector has detected a slide operation, the model processor moves the three-dimensional character without interruption in the movement processing in the common operation period.

18 Claims, 7 Drawing Sheets

ELECTRONIC GAME DEVICE AND ELECTRONIC GAME PROGRAM

This application claims foreign priority under 35 USC 119 based on Japanese Patent Application No. 2017-112756, filed on Jun. 7, 2017, the contents of which is incorporated herein in its entirety by reference.

BACKGROUND

1. Technical Field

The present invention relates to an electronic game device and an electronic game program (e.g., non-transitory computer-readable medium including instructions to be performed on a processor).

2. Related Art

There is a related art electronic game in which objects (such as characters in a game) are displayed and the objects are moved around in a game space in accordance with operations by a player. With some of these known electronic games, three-dimensional objects are defined in a three-dimensional virtual space, and 3D computer graphics are used so that the three-dimensional objects are subjected to projection conversion on the basis of the position and orientation of a virtual camera defined in the virtual space, and two-dimensional images are formed and displayed (Patent Document 1, for example).

PRIOR ART DOCUMENT

Patent Document

[Patent Document 1] Japanese Patent No. 5,994,019

SUMMARY

Problems to be Solved by the Invention

Electronic game devices that provide electronic games usually have an operation acceptance component that accepts operations from a player. For example, if the operation acceptance component is a touch panel, operations include: a slide operation in which an operation means (a finger, a stylus, etc.) is moved for at least a specific length of time while in contact with the touch panel, a flick operation in which the operation means is moved while in contact with the touch panel and the operation means is then removed from the touch panel within a specific length of time, a tap operation in which the operation means is brought into contact with the touch panel for a short time, and a long tap (long press) operation in which the operation means is left in contact with the touch panel for a long time.

In electronic games, different commands are usually assigned to different operations. Consequently, the electronic game device identifies the operation of the player and then executes processing to match the command with the corresponding identified operation.

However, of the various operations that can be accepted by the operation acceptance component, there are a number of operations that have operation content in common for a certain length of time after the start of the operation. For example, the above-mentioned slide operation and flick operation share the fact that the operation means is moved while in contact with the touch panel, and if the operation means is removed from the touch panel within a specific length of time, the operation is a flick operation, but if contact is maintained between the operating means and the touch panel for at least a specific length of time, the operation is a slide operation. That is, the electronic game device cannot determine that an operation performed by the player is a slide operation until a specific length of time has elapsed since the player started the operation and the operation means touched the touch panel and started moving.

Thus, when the electronic game device can accept a plurality of operations that have operation content in common for a certain length of time after the start of the operation, the electronic game device cannot determine (identify) the operation entered by the player as long as the player is carrying out the common operation content from the start of the operation. As a result, a time lag occurs between the start of the operation and the execution of the command corresponding to that operation.

If one of the operations with common operation content for a certain length of time after the start of the operation is for inputting a command to move an object, the problem caused by the above-mentioned time lag becomes more pronounced. That is, the player wants to move an object by performing an operation, but because the determination of the operation by the electronic game device is delayed, the start of movement of the object ends up being delayed beyond the start of the operation by the player.

An object of the present invention is to be able to move an object earlier when a first operation is accepted in an electronic game device capable of accepting a first operation that exhibits the effect of moving an object in an electronic game and a second operation that has operation content in common with the first operation for a certain length of time after the start of the operation.

Means for Solving the Problems

The present invention is an electronic game device, comprising: a display processor that causes a display component to display an object in an electronic game that can be operated by a player, an operation acceptance component that accepts from a player a first operation for inputting a command to move the object in the game space, and a second operation that is different from the first operation and that has a common operation portion in which the operation content is shared with the first operation for a certain length of time after the start of the operation, an in-operation processor that moves the object in the game space while the common operation portion is being accepted after the operation acceptance component has started accepting either the first operation or the second operation, and a post-operation processor that executes processing corresponding to either the first operation or the second operation if it has been determined that the operation accepted by the operation acceptance component is either of the first operation or the second operation.

Optionally, the in-operation processor moves the object in a movement direction determined based on the operation content in the common operation portion.

Optionally, the post-operation processor moves the object without interruption in the movement processing of the object by the in-operation processor if it has been determined that the operation accepted by the operation acceptance component is the first operation.

Optionally, the display processor causes the display component to display a game screen formed on the basis of the position and orientation of a virtual camera defined within a three-dimensional virtual space as the game space, the first operation is an operation for inputting a command to move the three-dimensional object within the virtual space, and the in-operation processor moves the three-dimensional object within the virtual space while the operation acceptance component is accepting the common operation portion.

Optionally, if it has been determined that the operation accepted by the operation acceptance component is the second operation, the post-operation processor stops the movement of the three-dimensional object by the in-operation processor, moves the position of the virtual camera to the rear of the three-dimensional object moved by the in-operation processor, and sets the orientation of the virtual camera in the direction of the three-dimensional object.

Optionally, wherein the operation acceptance component is configured to include a touch panel, the first operation is started when an operation means touches the touch panel and is an operation of moving while the operation means maintains contact with the touch panel, and is a slide operation in which the contact between the operation means and the touch panel is maintained for at least a specific length of time from the start of operation, and the second operation is started when the operation means touches the touch panel and is an operation of moving while the operation means maintains contact with the touch panel, and is a flick operation in which the operation means is removed from the touch panel within a specific length of time from the start of operation.

The present invention is also a computer-implemented method, as well as an electronic game program (non-transitory computer-readable medium including instructions to be performed on a processor), that causes a computer to function as: a display processor that causes a display component to display an object in an electronic game that can be operated by a player, an operation acceptance component that accepts from a player a first operation for inputting a command to move the object in the game space, and a second operation that is different from the first operation and that has a common operation portion in which the operation content is shared with the first operation for a certain length of time after the start of the operation, an in-operation processor that moves the object in the game space while the common operation portion is being accepted after the operation acceptance component has started accepting either the first operation or the second operation, and a post-operation processor that executes processing corresponding to either the first operation or the second operation if it has been determined that the operation accepted by the operation acceptance component is either of the first operation or the second operation.

Effects of the Invention

With the present invention, an object can be moved earlier when a first operation is accepted in an electronic game device capable of accepting a first operation that exhibits the effect of moving an object in an electronic game and a second operation that has operation content in common with the first operation for a certain length of time after the start of the operation.

DETAILED DESCRIPTION OF THE INVENTION

Detailed Description

Figure 1:
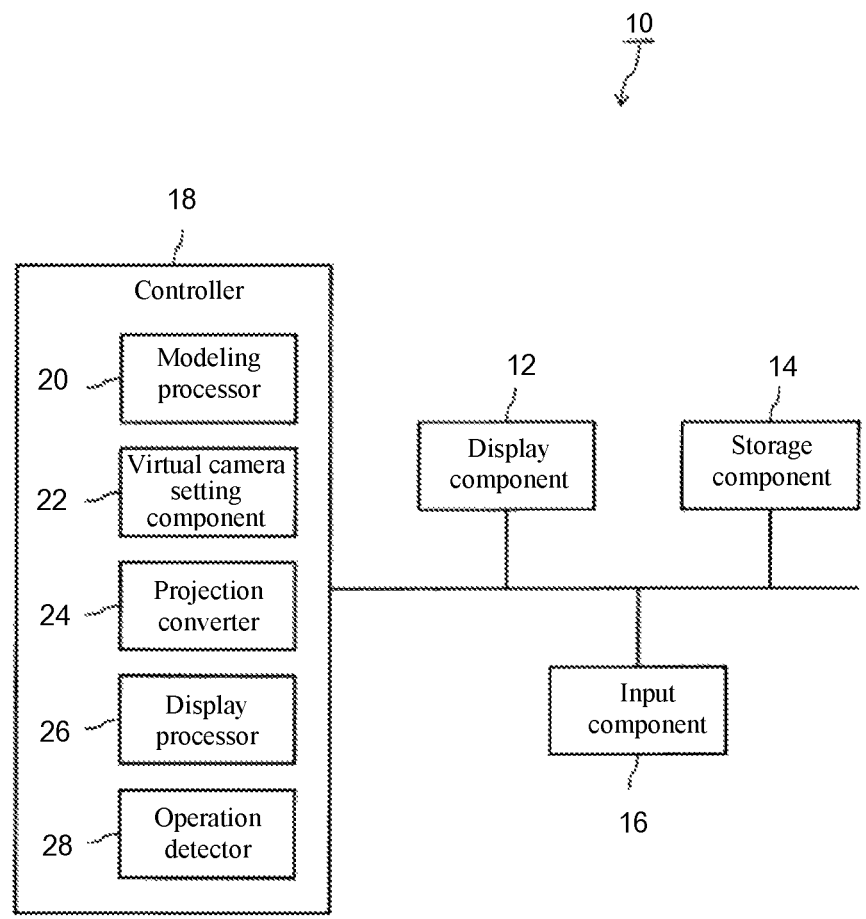
FIG. 1 A simplified diagram of the configuration of an electronic game device pertaining to an embodiment.

FIG. 1 is a simplified diagram of the configuration of an electronic game device 10 pertaining to this embodiment. The electronic game device 10 is a computer capable of executing an electronic game program (e.g., non-transitory computer-readable medium including instructions to be performed on a processor), thereby providing an electronic game to a player. The electronic game device 10 is a terminal having a touch panel, and is a tablet terminal or a smartphone, for example.

In this embodiment, the electronic game executed by the electronic game device 10 is a game in which the player operates a character (an object) in an electronic game. In particular, the electronic game in this embodiment is a game in which real-time behavior is required in the electronic game with respect to operations by the player, and is, for example, a fighting game in which a character moves, attacks, defends, etc., while fighting other characters according to operations by the player.

As will be described in detail below, in the electronic game in this embodiment, three-dimensional characters are defined as three-dimensional objects in a three-dimensional virtual space having a world coordinate system as a game space, and the player is able to manipulate these three-dimensional characters. In this virtual space, the position, line-of-sight direction, and upward direction of the virtual camera are defined, and these are used as a reference to perform processing to project three-dimensional characters onto a two-dimensional screen with respect to the three-dimensional space including these characters. A two-dimensional image including the two-dimensional images of the characters formed by this projection processing is displayed on the electronic game device 10.

The display component 12 is constituted by a liquid crystal panel, for example. Various game screens are displayed on the display component 12. Of these game screens, the play screen displayed during play includes characters that the player can manipulate.

An input component 16 (operation acceptance component) is configured to include a touch panel, for example. The input component 16 can accept various operations (slide operation, flick operation, tap operation, long tap operation, etc.) from the player. More specifically, the player performs an operation by bringing a finger (operation means) into contact with the touch panel. A stylus or the like may be used in place of the player's finger as the operation means. Various kinds of operation content will be described in detail below.

A storage component 14 is constituted by a ROM (read-only memory) or a RAM (random-access memory), for example. The storage component 14 stores an electronic game program (e.g., non-transitory computer-readable medium including instructions to be performed on a processor). In this electronic game program, commands used in the electronic game are defined with respect to the various operations inputted by the player to the input component 16. The storage component 14 also stores various kinds of information related to the electronic game.

A controller 18 is configured to include a CPU (central processing unit), a microcontroller, a dedicated IC for image processing, or the like. The controller 18 executes processing involved in the electronic game in accordance with the electronic game program (e.g., non-transitory computer-readable medium including instructions to be performed on a processor), and also actuates the various parts of the electronic game device 10. For example, the controller 18 performs the processing and management of parameters (hit points, etc.) for the electronic game related to characters operated by the player, determines the success or failure of attacks on other characters, determines the success or failure of attacks from other characters, and so forth. Also, as shown in FIG. 1, the controller 18 functions as a modeling processor 20, a virtual camera setting component 22, a projection converter 24, a display processor 26, and an operation detector 28.

The modeling processor 20 defines the three-dimensional characters used in the electronic game in a virtual space having a world coordinate system. For example, a three-dimensional character is constituted as a conglomeration of numerous polygons defined by three points (coordinates) in the world coordinate system. Also, the modeling processor 20 can move three-dimensional characters in the virtual space according to operations by the player. The movement of a three-dimensional character in the virtual space is realized by coordinate transformation of the polygons constituting that three-dimensional character. The processing for moving a three-dimensional character performed by the modeling processor 20 will be discussed below.

The virtual camera setting component 22 sets a virtual camera in the virtual space. More specifically, the position, line-of-sight direction, and upward direction of the virtual camera are set. Since the orientation of the virtual camera is determined by the line-of-sight direction and the upward direction of the virtual camera, in this Specification the concept including the line-of-sight direction and the upward direction of the virtual camera is referred to as "orientation." Also, the virtual camera setting component 22 can change the position and/or the orientation of the virtual camera according to operations by player. The processing for changing the position or orientation of the virtual camera by the virtual camera setting component 22 will be described below.

The projection converter 24 projects a three-dimensional character onto a two-dimensional screen defined in the virtual space on the basis of the position and orientation of the virtual camera set by the virtual camera setting component 22, and thereby produces a two-dimensional image that includes the projection image of a three-dimensional object.

Figure 2:
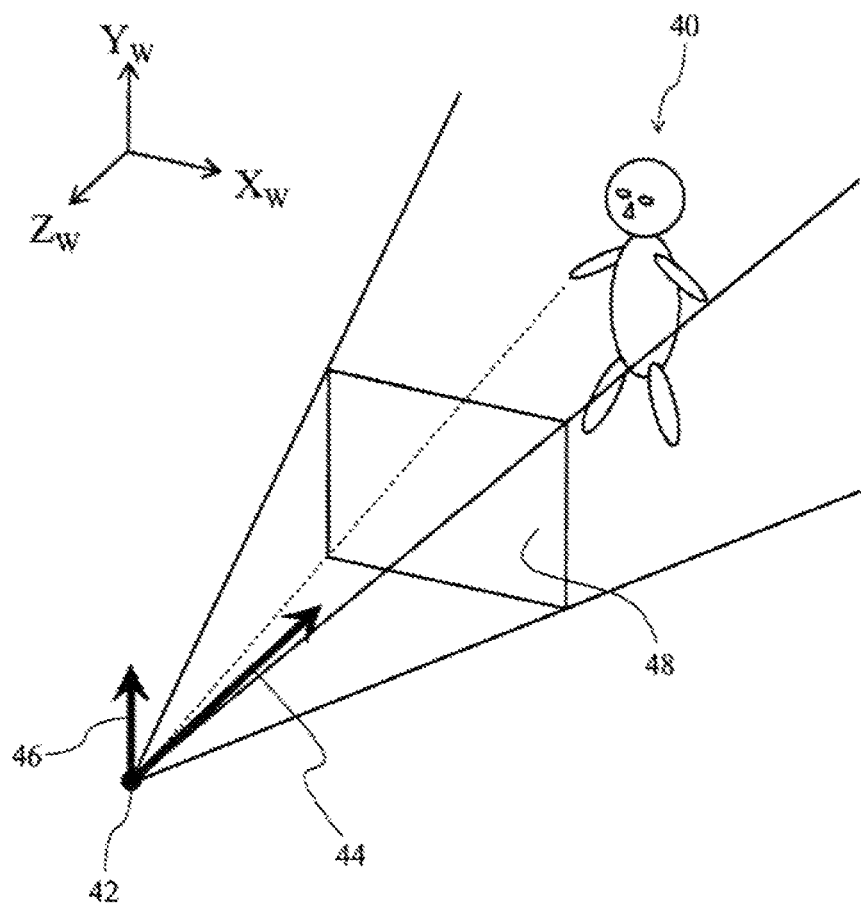
FIG. 2 A concept diagram showing a three-dimensional character, a virtual camera, and a two-dimensional screen defined in a virtual space.

FIG. 2 shows a three-dimensional character 40 and a virtual camera 42 defined in the virtual space. Also, in FIG. 2, the world coordinate system is indicated by the $X_W$ axis, the $Y_W$ axis, and the $Z_W$ axis. FIG. 2 shows the position of the virtual camera 42, the line-of-sight direction 44 of the virtual camera 42, and the upward direction 46 of the virtual camera 42. The line-of-sight direction 44 and the upward direction 46 are defined by a three-dimensional vector whose viewpoint is the position of the virtual camera 42. A field of view is defined at a constant viewing angle in the viewing direction 44 from the virtual camera 42, and a two-dimensional screen 48, which is a plane perpendicular to the line-of-sight direction 44, is defined in this field of view. The upward direction of the two-dimensional screen 48 (the upper side of the two-dimensional image) is determined according to the upward direction 46 of the virtual camera 42. An object in the virtual space including the three-dimensional character 40 is projected onto the two-dimensional screen 48 by a projection method such as perspective projection conversion. As a result, a two-dimensional image including the projected image of the three-dimensional character 40 is formed on the two-dimensional screen 48.

FIG. 2 shows only the three-dimensional character 40 manipulated by the player, but other three-dimensional characters (such as three-dimensional characters to be battled) are also defined in the virtual space. The success or failure of the attack on another three-dimensional character or the success or failure of the attack from another three-dimensional character is determined by also taking into account the positional relationship between the three-dimensional character 40 manipulated by the player and other three-dimensional characters in the virtual space.

The display processor 26 performs processing that causes the display component 12 to display a two-dimensional image including the projection image of the three-dimensional character 40 formed on the two-dimensional screen 48. Consequently, a character that can be manipulated by the player is displayed on the display component 12. In this processing, cropping out a part of a two-dimensional image on the two-dimensional screen 48, size conversion, or other such processing (view port conversion) may be performed.

The projection converter 24 and the display processor 26 execute the above-mentioned projection processing and display processing every time the object included in the field of view moves and every time the position or orientation of the virtual camera 42 is changed.

The operation detector 28 detects an input operation by the player with respect to the input component 16. More specifically, touch (contact), movement, removal, contact time, and the like of the player's finger on the touch panel are sensed, which allows the operation content of the player to be identified and detected. As discussed above, the player can perform various operations on the input component 16, but in this embodiment, we will describe a case in which the first operation is a slide operation and the second operation is a flick operation.

A slide operation is begun by bringing the finger of the player into contact with the touch panel and involves moving the finger while keeping it in contact with the touch panel, with this contact maintained between the finger and the touch panel for at least a specific length of time from the start of the operation. A flick operation is begun by bringing the finger of the player into contact with the touch panel and involves moving the finger while keeping it in contact with the touch panel, with the finger being removed from the touch panel within a specific length of time from the start of the operation. The above-mentioned specific length of time may be appropriately set in advance, but in this embodiment it is a time of about a few tenths of a second.

Figure 3:
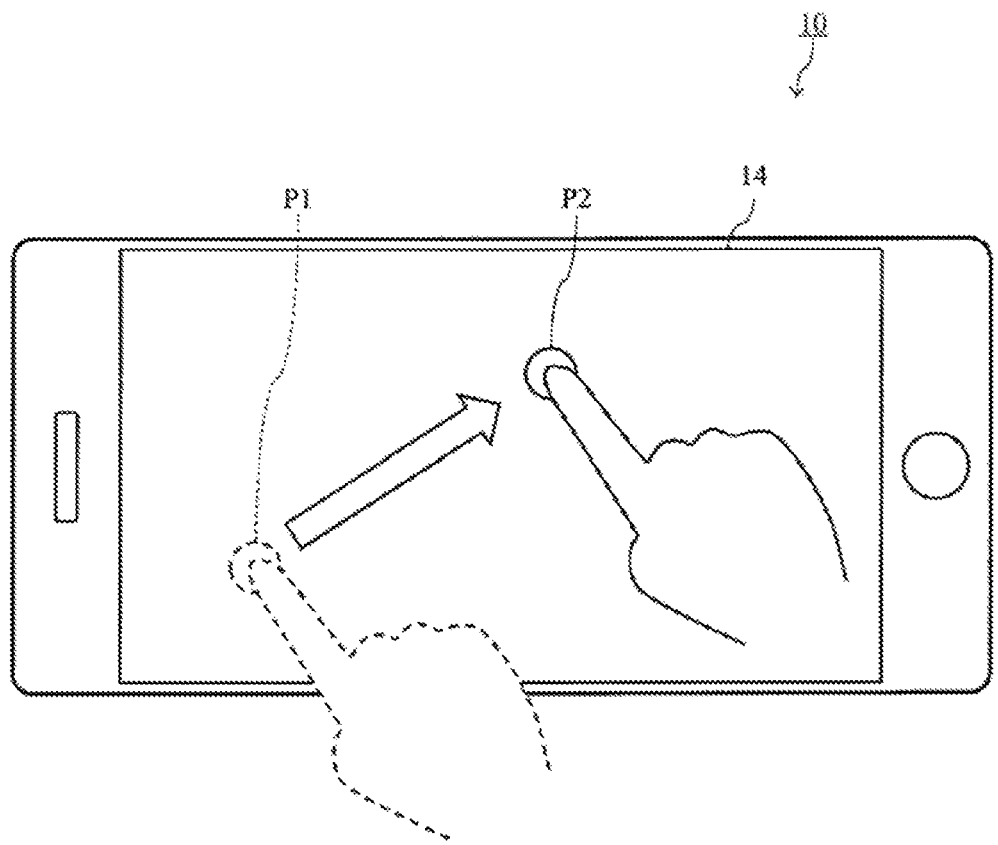
FIG. 3 A concept diagram showing how a player operates a touch panel.

FIG. 3 shows how the player touches a finger at the position P1 on the touch panel constituting the input component 16 and moves the finger from there to the position P2 on the touch panel. The operation detector 28 detects that either a slide operation or a flick operation has begun when the player's finger that touched the position P1 has started to move. Then, if a specific length of time has elapsed since the start of the operation by the player until reaching position P2, the operation detector 28 determines that the operation is a slide operation. On the other hand, if the time from the start of the operation by the player until the finger is removed from the touch panel at the position P2 is within a specific length of time, the operation detector 28 determines that the operation is a flick operation.

In a slide operation and a flick operation, the operation content is shared for a certain length of time after the start of the operation. More precisely, a slide operation and a flick operation have common operation content in that the operation is started by contact between the touch panel and a finger, and the finger is moved from there while in contact with the touch panel for a fixed period within a specific length of time. This common part is referred to as the "common operation portion" in this Specification. Also, the time during which the player is operating the common operation portion is referred to in this Specification as the "common operation period."

In the common operation period, the operation detector 28 cannot determine whether a player operation is a slide operation or a flick operation. More precisely, if the player has performed a slide operation, the operation detector 28 cannot determine that the accepted operation is a slide operation until a specific length of time has elapsed since the start of the operation, and if the player has performed a flick operation, the operation detector 28 cannot determine that the accepted operation is a flick operation until the flick operation is completed.

As described above, with the electronic game program (e.g., non-transitory computer-readable medium including instructions to be performed on a processor) in this embodiment, it is possible to accept various operations performed by the player on the input component 16, and different commands for the electronic game are associated with the various kinds of operation that can be detected by the operation detector 28. In this embodiment, a command to move the three-dimensional character 40 in the virtual space and to slowly change the position and orientation of the virtual camera 42 so as to follow the three-dimensional character 40 from behind is associated with a slide operation. Also, a command not to move the three-dimensional character 40, and to immediately move the position of the virtual camera 42 to behind the three-dimensional character 40 and to change the orientation of the virtual camera 42 in the direction of the three-dimensional character 40 is associated with a flick operation. Therefore, the modeling processor 20 and the virtual camera setting component 22 perform processing according to the operation of the player detected by the operation detector 28. The processing by the modeling processor 20 and the virtual camera setting component 22 according to player operation will be described in detail below.

Figure 4:
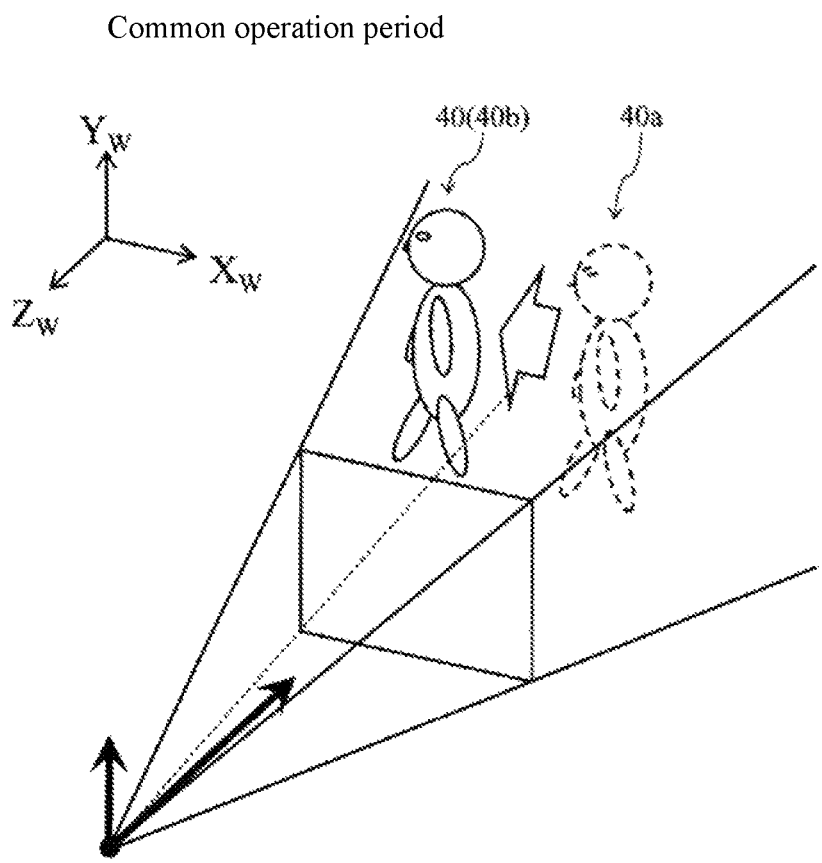
FIG. 4 A concept diagram showing how a three-dimensional character moves during a common operation period.

In this embodiment, after the operation detector 28 has detected the start of either a slide operation or a flick operation, the modeling processor 20 moves the three-dimensional character 40 in the virtual space while the operation detector 28 is detecting the common operation portion (that is, during the common operation period). The modeling processor 20 thus functions as an in-operation processor. FIG. 4 shows how the three-dimensional character 40 moves in the common operation period. In FIG. 4, the three-dimensional character 40 is at a position 40a at the point when either a slide operation or a flick operation begins, and the drawing shows how the three-dimensional character 40 moves to the position 40b in the common operation period. As described above, when the three-dimensional character 40 moves, the projection converter 24 and the display processor 26 perform processing, so the movement of the three-dimensional character 40 in the common operation period is also reflected on the display component 12.

The movement direction of the three-dimensional character 40 in the common operation period is determined on the basis of the operation content of the common operation portion. In this embodiment, the movement direction of the three-dimensional character 40 in the common operation period is determined according to the movement direction of the finger from the position on the touch panel where the player placed his finger. For example, as shown in FIG. 2, when the three-dimensional character 40 is facing in the $Z_W$ axis positive direction and video of the three-dimensional character 40 as seen from the front is being displayed on the display component 12, if a finger is moved from right to left on the touch panel, the modeling processor 20 moves the three-dimensional character 40 in the $X_W$ axis negative direction in the common operation period, as shown in FIG. 4.

If the player's finger is removed from the touch panel in the above-mentioned specific length of time after the detection of the start of an operation, the operation detector 28 determines that the player's operation is a flick operation. If the operation detector 28 detects a flick operation, the modeling processor 20 and the virtual camera setting component 22 execute the processing associated with a flick operation in response to this. As described above, a flick operation is associated with a command not to move the three-dimensional character 40 (to stop the movement), to immediately move the position of the virtual camera 42 to behind the three-dimensional character 40, and to change the orientation of the virtual camera 42 to the direction of the three-dimensional character 40, so the modeling processor 20 and the virtual camera setting component 22 execute processing to accomplish this. In this manner, the modeling processor 20 and the virtual camera setting component 22 function as a post-operation processor.

Figure 5:
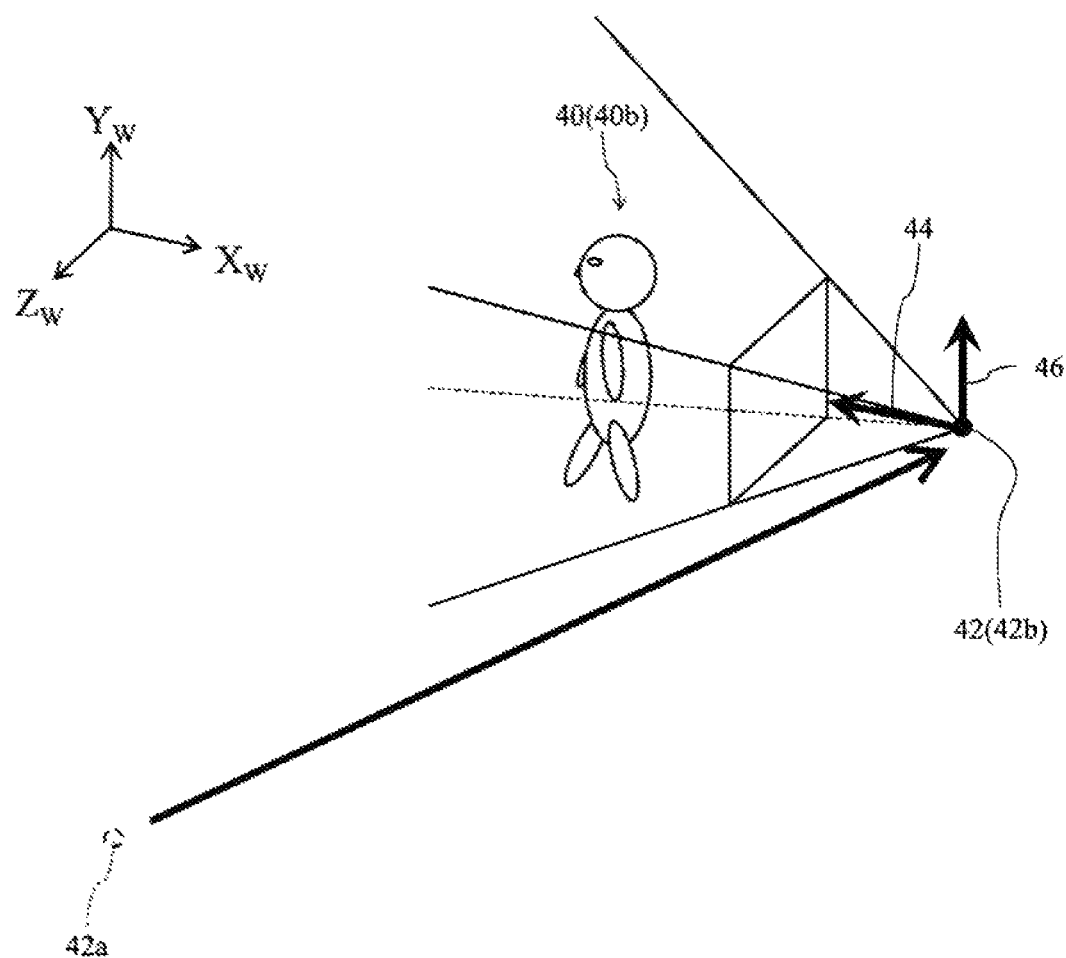
FIG. 5 A concept diagram showing the movement of the virtual camera after a flick operation.

FIG. 5 shows the position and orientation of the virtual camera 42 after a flick operation. Due to movement in the common operation period, it is assumed that the three-dimensional character 40 has moved to the position 40b and is facing in the $X_W$ axis negative direction. At this point, if the finger is removed from the touch panel and the operation detector 28 determines that it is a flick operation, the modeling processor 20 stops the movement of the three-dimensional character 40. In addition, the virtual camera setting component 22 immediately moves the virtual camera 42 to the position 42b, which is behind the three-dimensional character 40 facing the $X_W$ axis negative direction and in the position 40b. Furthermore, the virtual camera setting component 22 sets the line-of-sight direction 44 and the upward direction 46 so that the orientation of the virtual camera 42 is the direction toward the three-dimensional character 40.

If the above-mentioned specific length of time has elapsed while contact with the touch panel is maintained after detecting the start of the operation, the operation detector 28 determines that the player operation is a slide operation. If the operation detector 28 detects a slide operation, the modeling processor 20 and the virtual camera setting component 22 execute the processing associated with the slide operation in response to this. As described above, a slide operation is associated with a command to move the three-dimensional character 40 and to slowly change the position and orientation of the virtual camera 42 so as to follow the three-dimensional character 40 from behind, so the modeling processor 20 and the virtual camera setting component 22 (post-operation processors) execute the processing in this way.

Figure 6:
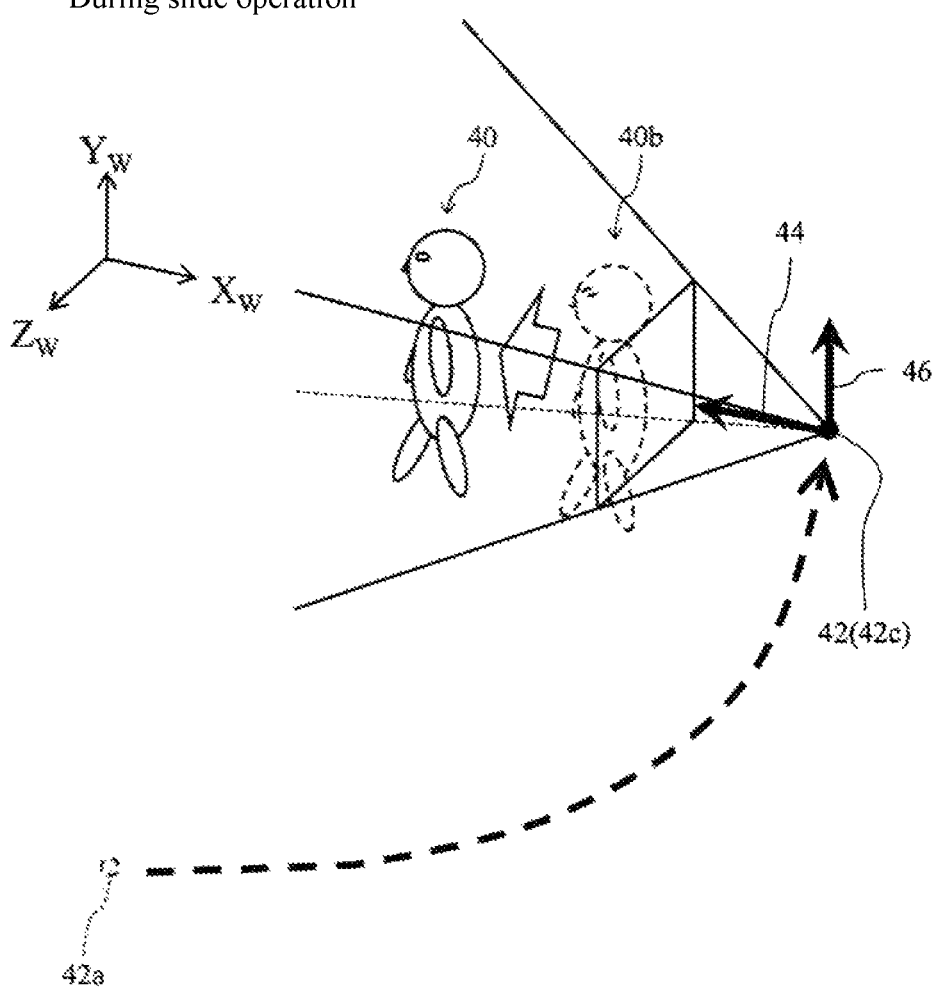
FIG. 6 A concept diagram showing the movement of the three-dimensional character and the virtual camera during a slide operation.

FIG. 6 shows how the position of the three-dimensional character 40 and the position and orientation of the virtual camera 42 are changed during a slide operation. Let us assume that movement in the common operation period causes the three-dimensional character 40 to move to the position 40b and be oriented in the $X_W$ axis negative direction. After this, if the operation detector 28 detects a slide operation, the modeling processor 20 moves the three-dimensional character 40 according to the direction of the slide operation without interruption in the movement processing in the common operation period. Along with this, the virtual camera setting component 22 slowly moves the position of the virtual camera 42 from the position 42a at the point when the slide operation was detected toward the position 42c, which is behind the moving three-dimensional character 40. The position 42c moves with the three-dimensional character 40. During the movement of the virtual camera 42, the orientation of the virtual camera 42 (the line-of-sight direction 44 and the upward direction 46) is slowly changed to maintain the direction to the three-dimensional character 40.

Figure 7:
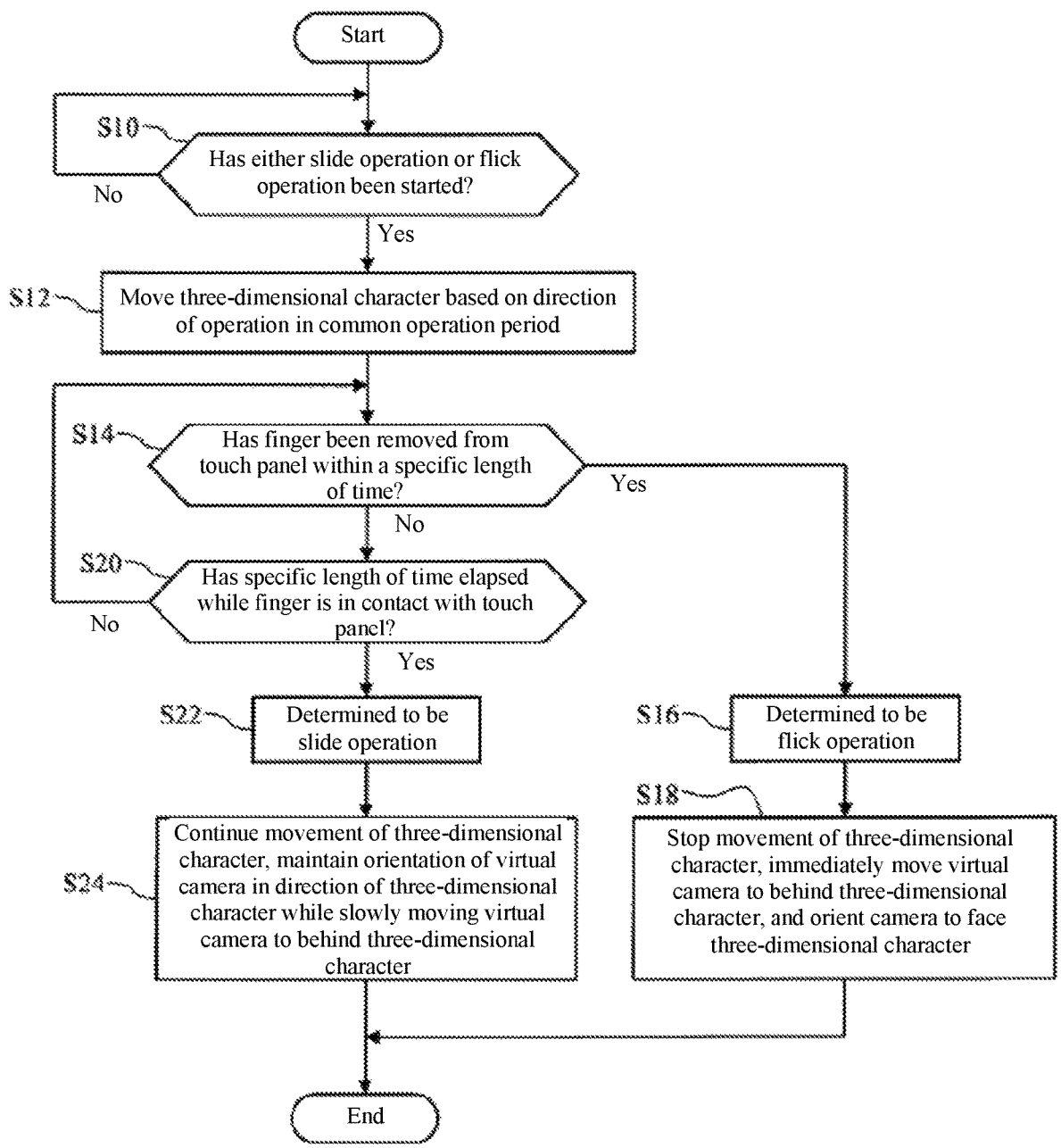
FIG. 7 A flowchart of the flow of processing of the electronic game device pertaining to this embodiment.

The processing flow of the electronic game device 10 pertaining to this embodiment will now be described through reference to the flowchart shown in FIG. 7. The flowchart in FIG. 7 is repeatedly executed during the game play of the electronic game provided by the electronic game device 10.

In step S10, the operation detector 28 detects whether or not the player has started either a slide operation or a flick operation on the input component 16. If the start of an operation is detected, the flow proceeds to step S12, and if it is not detected, the system stands by until a start of an operation is detected.

In step S12, the modeling processor 20 moves the three-dimensional character 40 in the virtual space in the player operation direction, that is, the direction corresponding to the movement direction of the finger with respect to the touch panel, in the common operation period.

In step S14, the operation detector 28 determines whether or not the player's finger has been removed from the touch panel within a specific length of time since the start of the operation. If it has been removed, the flow proceeds to step S16.

In step S16, the operation detector 28 determines that the player's operation is a flick operation.

In step S18, the modeling processor 20 and the virtual camera setting component 22 perform processing according to a flick operation. That is, the modeling processor 20 stops the movement of the three-dimensional character 40, and the virtual camera setting component 22 immediately moves the position of the virtual camera 42 to behind the three-dimensional character 40 and sets the orientation of the virtual camera 42 to the direction of the three-dimensional character 40.

If it is determined in step S14 that the player's finger has not been removed from the touch panel, in step S20 the operation detector 28 determines whether or not a specific length of time has elapsed since the start of the operation. If the specific length of time has not elapsed, the flow returns to step S14, and the processing is repeated from S14. If the specific length of time has elapsed, the flow proceeds to step S22.

In step S22, the operation detector 28 determines that the player operation is a slide operation.

In step S24, the modeling processor 20 and the virtual camera setting component 22 perform processing corresponding to a slide operation. That is, the modeling processor 20 continues the movement of the three-dimensional character 40, while the virtual camera setting component 22 keeps the virtual camera 42 oriented in the direction of the three-dimensional character 40, while slowly moving the position of the virtual camera 42 to behind the three-dimensional character 40.

The basic configuration of the electronic game device 10 pertaining to this embodiment is as described above. With the electronic game device 10 pertaining to this embodiment, in the common operation period during which the operation detector 28 cannot determine whether a player operation is a slide operation or a flick operation, the modeling processor 20 moves the three-dimensional character 40. Consequently, although movement of an object could not be started during the common operation period in the past, with this embodiment it is possible to start moving an object in the common operation period. Optionally, movement of the object can be started immediately after the operation is started. That is, when the player performs a slide operation to move the three-dimensional character 40, the three-dimensional character 40 can be moved earlier than in the past. In other words, the response of the electronic game to an operation is improved, which allows the player to better enjoy playing the electronic game.

Also, in the common operation period, the movement direction of the three-dimensional character 40 is determined according to the player operation direction, so the movement direction of the three-dimensional character 40 in the common operation period matches the player's intentions. Furthermore, if a slide operation is detected after the common operation period, the three-dimensional character 40 is moved without interruption in the movement processing in the common operation period, so the three-dimensional character 40 can be moved as a series of movements, without any sense of unnaturalness before and after the point when the slide operation is detected.

Also, if the player performs a flick operation, the virtual camera 42 moves to behind the three-dimensional character 40 after the three-dimensional character 40 moves a little according to the operation direction in the common operation period, and the camera faces in the direction of the three-dimensional character 40. Consequently, the player can set the orientation of the virtual camera 42 in any desired direction, depending on the direction of the flick operation. For example, as shown in FIG. 2, when the three-dimensional character 40 is facing in the $Z_W$ axis positive direction and video of the three-dimensional character 40 as seen from the front is displayed on the display component 12, if the player wants the orientation of the virtual camera 42 to be facing to the left side (the $X_W$ axis negative direction side), the three-dimensional character 40 can be oriented to face the $X_W$ axis negative direction side by performing a right-to-left flick operation, which allows the orientation of the virtual camera 42, which has moved to behind the three-dimensional character 40, to be in a direction facing the $X_W$ axis negative direction.

An embodiment of the present invention was described above, but the present invention is not limited to the above embodiment and various modifications are possible without departing from the gist of the present invention.

For example, in the above embodiment, an example was given in which the first operation was a slide operation and the second operation was a flick operation, but as long as there is a common operation portion, the first operation and the second operation may be some other operation. For example, the first operation may be a long tap operation in which the finger is held in contact with the touch panel for an extended period, and the second operation may be a tap operation in which the finger is held in contact with the touch panel for a short time.

In the above embodiment, an example was given in which the operation acceptance component had a touch panel, but as long as a first operation and a second operation having a common operation portion can be accepted, other configurations can be adopted instead. For example, a controller having buttons, a sensor such as a camera that detects movement (gestures) of a player's body, or the like may be used.

In the above embodiment, a command to change the position and orientation of the virtual camera 42 and the movement of the three-dimensional character 40 was associated with the first operation, and a command to change the position and orientation of the virtual camera 42 was associated with the second operation, but as long as a command to move the three-dimensional character 40 is associated with the first operation and/or the second operation, it would be possible to associate some other commands.

Also, the present invention can be favorably applied to a case in which three or more operations have a common operation portion, and a command to move the three-dimensional character 40 is associated with at least one of these operations.

Also, the above embodiment described an electronic game in which the three-dimensional character 40 defined in a virtual space was operated, but the present invention is not limited to the use of a virtual space or the three-dimensional character 40, and can also be favorably applied to an electronic game that is processed on a two-dimensional image. In this case, the controller 18 comprises a game processor as an in-operation processor and a post-operation processor instead of the modeling processor 20, the virtual camera setting component 22, and the projection converter 24. If the operation detector 28 detects the start of either the first operation or the second operation, this game processor moves a two-dimensional character within the two-dimensional game space on the display component 12 in the common operation period. After this, the movement is continued when the first operation associated with the movement command is detected, and when the second operation associated with another command (such as an attack command) is detected, the processing relating to that other command is executed.

DESCRIPTION OF THE REFERENCE NUMERALS

10 electronic game device, 12 display component, 14 storage component, 16 input component, 18 controller, 20 modeling processor, 22 virtual camera setting component, 24 projection converter, 26 display processor, 28 operation detector, 40 three-dimensional character, 42 virtual camera, 44 line-of-sight direction, 46 upward direction, 48 two-dimensional screen.

The invention claimed is:

1. An electronic game device, comprising:
   a display; and
   at least one processor that is configured to detect both a first type of input operation and a second type of input operation, wherein a start of the first type of input operation and a start of the second type of input operation are identical, such that the first type of input operation cannot be distinguished from the second type of input operation until an expiration of a common operation period,
   wherein the at least one processor is further configured to
      execute an electronic game that displays an object that can be operated by a player on the display,
      detect a start of an input operation that could be either the first type of input operation or the second type of input operation, and,
      in response to detecting the start of the input operation,
         monitor an elapsed time since the start of the input operation,
         while the elapsed time is within the common operation period and the input operation has not ended, operate the object according to the first type of input operation, and,
         after the elapsed time exceeds the common operation period or the input operation has ended within the common operation period,
            determine whether the input operation is the first type or the second type of input operation,
            when determining that the input operation is the first type of input operation, continue operating the object according to the first type of input operation, and,
            when determining that the input operation is the second type of input operation, stop operating the object according to the first type of input operation, and start operating the object according to the second type of input operation.

2. The electronic game device according to claim 1, wherein operating the object according to the first type of input operation comprises moving the object in a movement direction based on the input operation.

3. The electronic game device according to claim 2, wherein continuing operating the object according to the first type of input operation comprises continuing to move the object in the movement direction without interruption.

4. The electronic game device according to claim 2, wherein execution of the electronic game displays a game screen on the display, wherein the game screen is formed based on a position and orientation of a virtual camera defined within a three-dimensional virtual game space.

5. The electronic game device according to claim 4, wherein operating the object according to the second type of input operation comprises moving the position of the virtual camera to a rear of the object within the virtual game space, and setting the orientation of the virtual camera in a direction of the object.

6. The electronic game device according to claim 1, further comprising a touch panel configured to receive the input operation, wherein the first type of input operation is a slide operation in which contact to the touch panel is maintained for at least the common operation period, and wherein the second type of input operation is a flick operation in which the contact to the touch panel is ended within the common operation period.

7. A computer-implemented method that comprises using at least one processor to:
   execute an electronic game that displays an object that can be operated by a player on a display;

detect a start of an input operation that could be either a first type of input operation or a second type of input operation, wherein a start of the first type of input operation and a start of the second type of input operation are identical, such that the first type of input operation cannot be distinguished from the second type of input operation until an expiration of a common operation period; and, in response to detecting the start of the input operation, monitor an elapsed time since the start of the input operation, while the elapsed time is within the common operation period and the input operation has not ended, operate the object according to the first type of input operation, and, after the elapsed time exceeds the common operation period or the input operation has ended within the common operation period, determine whether the input operation is the first type or the second type of input operation, when determining that the input operation is the first type of input operation, continue operating the object according to the first type of input operation, and, when determining that the input operation is the second type of input operation, stop operating the object according to the first type of input operation, and start operating the object according to the second type of input operation.

8. The computer-implemented method according to claim 7, wherein operating the object according to the first type of input operation comprises moving the object in a movement direction based on the input operation.

9. The computer-implemented method according to claim 8, wherein continuing operating the object according to the first type of input operation comprises continuing to move the object in the movement direction without interruption.

10. The computer-implemented method according to claim 8, wherein execution of the electronic game displays a game screen on the display, wherein the game screen is formed based on a position and orientation of a virtual camera defined within a three-dimensional virtual game space.

11. The computer-implemented method according to claim 10, wherein operating the object according to the second type of input operation comprises moving the position of the virtual camera to a rear of the object within the virtual game space, and setting the orientation of the virtual camera in a direction of the object.

12. The computer-implemented method according to claim 7, further comprising receiving the input operation via a touch panel, wherein the first type of input operation is a slide operation in which contact to the touch panel is maintained for at least the common operation period, and wherein the second type of input operation is a flick operation in which the contact to the touch panel is ended within the common operation period.

13. A non-transitory computer-readable medium including instructions to be performed on a processor, wherein the instructions, when executed by the processor, cause the processor to:

execute an electronic game that displays an object that can be operated by a player on a display;

detect a start of an input operation that could be either a first type of input operation or a second type of input operation, wherein a start of the first type of input operation and a start of the second type of input operation are identical, such that the first type of input operation cannot be distinguished from the second type of input operation until an expiration of a common operation period; and, in response to detecting the start of the input operation, monitor an elapsed time since the start of the input operation, while the elapsed time is within the common operation period and the input operation has not ended, operate the object according to the first type of input operation, and, after the elapsed time exceeds the common operation period or the input operation has ended within the common operation period, determine whether the input operation is the first type or the second type of input operation, when determining that the input operation is the first type of input operation, continue operating the object according to the first type of input operation, and, when determining that the input operation is the second type of input operation, stop operating the object according to the first type of input operation, and start operating the object according to the second type of input operation.

14. The non-transitory computer-readable medium according to claim 13, wherein operating the object according to the first type of input operation comprises moving the object in a movement direction based on the input operation.

15. The non-transitory computer-readable medium according to claim 14, wherein continuing operating the object according to the first type of input operation comprises continuing to move the object in the movement direction without interruption.

16. The non-transitory computer-readable medium according to claim 14, wherein execution of the electronic game displays a game screen on the display, wherein the game screen is formed based on a position and orientation of a virtual camera defined within a three-dimensional virtual game space.

17. The non-transitory computer-readable medium according to claim 16, wherein operating the object according to the second type of input operation comprises moving the position of the virtual camera to a rear of the object within the virtual game space, and setting the orientation of the virtual camera in a direction of the object.

18. The non-transitory computer-readable medium according to claim 13, wherein the instructions further cause the processor to receive the input operation via a touch panel, wherein the first type of input operation is a slide operation in which contact to the touch panel is maintained for at least the common operation period, and wherein the second type of input operation is a flick operation in which the contact to the touch panel is ended within the common operation period.

* * * * *